Figure 1:
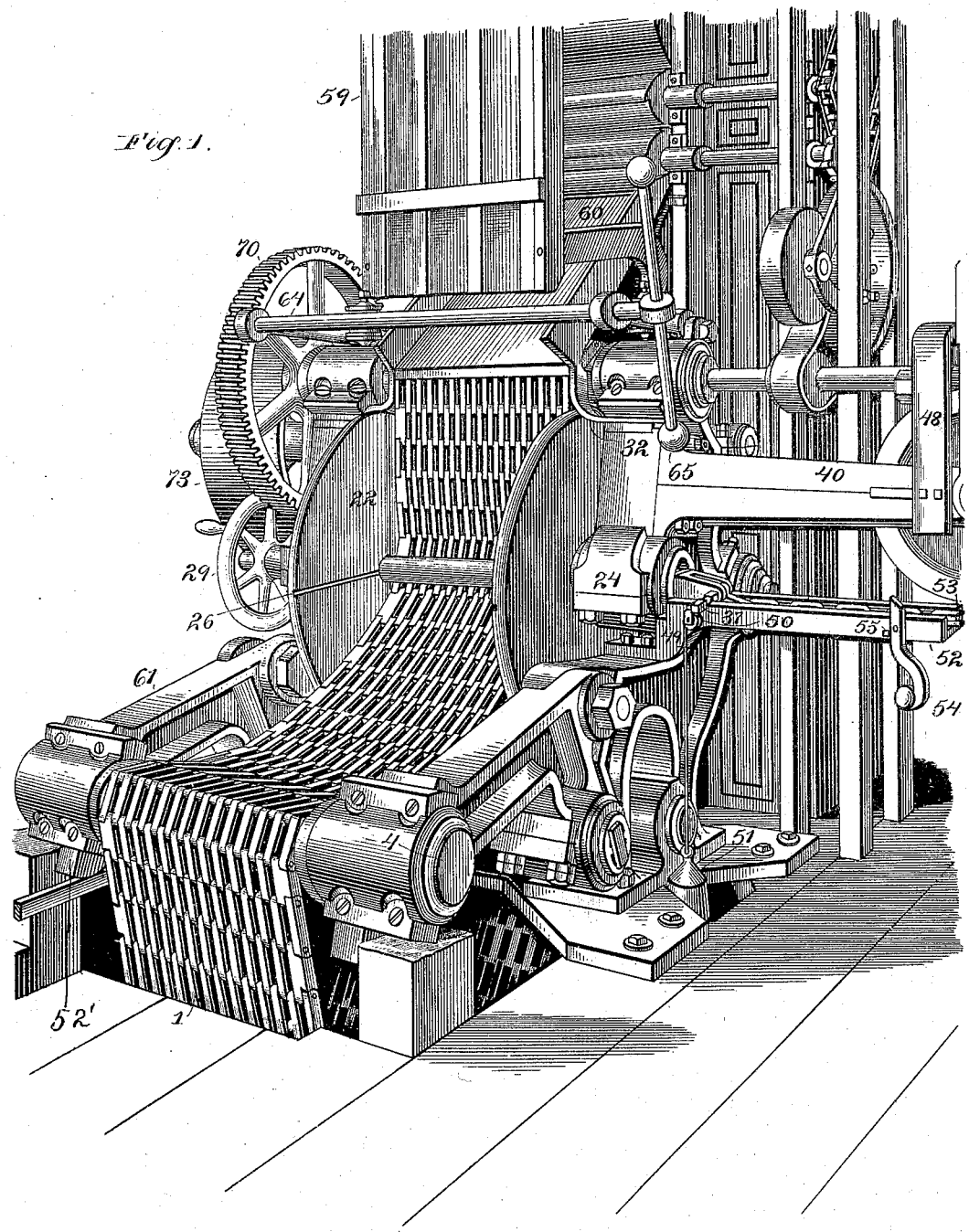

(No Model.)

7 Sheets—Sheet 1.

W. E. ANDERSON.
COTTON PRESS.

No. 604,012.

Patented May 17, 1898.

Witnesses.
Victor J. Evans.
Marie Wilson

Inventor.
William E. Anderson.
By E. W. Markle & Sons
Attorneys.

(No Model.) 7 Sheets—Sheet 5.

W. E. ANDERSON.
COTTON PRESS.

No. 604,012. Patented May 17, 1898.

Witnesses
Victor J. Evans
Marie Wilson

Inventor
William E. Anderson.
By E. M. Markle & Sons
Attorneys (No Model.)

W. E. ANDERSON.
COTTON PRESS.

No. 604,012.  Patented May 17, 1898.

Witnesses
Victor J. Evans.
Marie Wilson.

Inventor
William E. Anderson
By E. M. Marble & Sons
Attorneys (No Model.) 7 Sheets—Sheet 7.
W. E. ANDERSON.
COTTON PRESS.

No. 604,012. Patented May 17, 1898.

Witnesses
Victor J. Evans
Marie Wilson

Inventor
William E. Anderson
By E. M. Marble & Sons
Attorneys

UNITED STATES PATENT OFFICE.

WILLIAM E. ANDERSON, OF LITTLE ROCK, ARKANSAS, ASSIGNOR TO THE STANDARD CIRCULAR COTTON COMPANY, LIMITED, OF LIVERPOOL, ENGLAND.

COTTON-PRESS.

SPECIFICATION forming part of Letters Patent No. 604,012, dated May 17, 1898.

Application filed July 22, 1895. Serial No. 556,772. (No model.)

*To all whom it may concern:*

Be it known that I, WILLIAM E. ANDERSON, a citizen of the United States, residing at Little Rock, in the county of Pulaski and State of Arkansas, have invented certain new and useful Improvements in Cotton-Presses; and I do hereby declare the following to be a full, clear, and exact description of the invention, such as will enable others skilled in the art to which it appertains to make and use the same.

My invention relates to improvements in presses for baling cotton and other fibrous materials, and particularly to improvements in that class thereof in which the cotton is formed into cylindrical bales.

According to the method at this time usually employed in bringing cotton from the producer to the market the cotton is conveyed after it is picked to a common center, where a gin is located. On account of their cost cotton-gins and the accompanying condensers are usually not found on each plantation; but one or more gins are located in a central portion of a cotton-raising district, so as to satisfy the local demand without necessitating the hauling of the bulk cotton too great a distance. At the gin the cotton is ginned and compressed to such an extent as to render it profitable for the railroads to transport it, although the local presses now used in connection with cotton-gins are not powerful enough to compress the cotton sufficiently to enable the railroads to carry it economically—that is, to enable the cars to be loaded to their full capacity. The cotton is then carried by rail to some general center where a powerful compress is stationed and there reduced to a density which will fit it for ocean travel and commercial use.

Modern compresses apply enormous pressure to bales previously prepared by ordinary presses; but the fibers being treated in bulk and not in detail are subjected, as it were, to but superficial compression. The air which is in the fibers is not removed to any great extent, and consequently the cotton fibers assert their resiliency or elasticity in opposition to the compression to which they have been subjected and necessitate the use of strong iron bands to secure the bales into which they are formed. It is thus necessary, according to the present method, in order to prepare bales of cotton for ocean shipment, to compress them by two operations—first by local presses, and, second, by a more powerful compress. Owing to their great cost compresses are only located at fixed points and feed large surrounding territories. It is thus often necessary to carry plantation bales of cotton many hundred miles out of their direct route in order to reach one of these compresses. As the cotton can only be compressed to a comparatively slight degree by local presses, not sufficiently to enable the cars to be loaded to their full capacity, it will be seen that the cost of transportation is an important item in the final cost of the cotton on the market.

The objects of my invention are, first, to effect such condensation of the fiber in the first instance as will place it in proper condition for ocean and other shipment, and thus obviate the present enormous expense of hauling the cotton to storage-warehouses and compresses and of recompressing the plantation bales; second, to so form the bale by winding the cotton in the form of a sheet or bat around and around itself, effecting the compression of the cotton in detail by constant pressure on each layer, that any light ties which will arrest the expansion of the outer layer of the bale will also prevent the expansion of the inner layers which compose the bale and will leave the fiber in such condition that when the covering and the binding-ties have been removed the bale can be put upon a spindle, if desired, and the bat of cotton unwound in a continuous and unbroken sheet, although of course in a more compressed condition than when it was originally delivered from the condenser; third, to effect the compression of the cotton fibers in such a manner that while the desired density of the bale is obtained the fibers will not be broken or subjected to deteriorating influences; fourth, to form a cylindrical bale having straight or approximately straight sides and rounded edges of a size and density determined by the operator and capable of adjustment according to the mode and length of shipment; fifth, to provide a machine which will compress the cotton into bales without necessitating the stoppage of the condenser at the time of delivery of the several bales from the press or at any other time during the entire operation of the press, and, sixth, to provide a machine which while able to carry out the process of baling above mentioned shall be simple in construction, reliable in its operation, capable of being operated by ordinary plantation hands, and so moderate in its cost as to render its use in direct connection with the eighty-saw gins, now almost universally used in ginning cotton, both possible and profitable.

The process of baling cotton by the use of which I accomplish the objects of my invention consists in feeding the cotton in the form of a sheet or bat directly from the condenser of the gin or elsewhere into the press, winding it around and around upon itself or layer upon layer, and simultaneously subjecting the layers to friction and pressure. The cotton fibers will thus be compressed in detail and layer by layer and will acquire density in proportion to the size of the bale and the amount of pressure applied thereto.

My present invention, however, consists not in this method of forming cotton-bales, but in an improved press whereby the above-mentioned method can be carried out.

An important and fundamental feature of my machine is a weighted endless belt arranged to form an expansible loop or bight, within the loop or bight of which the cotton, which is preferably delivered in the form of a sheet or bat directly from the condenser, is wound around a central core, layer by layer, being subjected to continuous and simultaneous friction and pressure, and the compression upon each layer of fiber being effected in detail as it is fed to the bale. This feature of my invention is fully described and claimed in United States Letters Patent No. 510,388, granted to John W. Graves on December 5, 1893.

The principal features of my machine are, first, means for imparting a gradually-increasing tension to the baling device or devices of a cotton-press for making cylindrical bales; second, revolubly-mounted flanges stationed at either end of the core, which serve to guide the formation of the bale and to enable a bale to be formed which has perfectly straight sides, said flanges being operated in such a manner that the end expansion of the bale will be accommodated; third, a fixed core which is so secured to the press as to be removable while the bale is still forming and before it has been delivered from the machine; fourth, means operated by the machine itself for removing the core from the bale; fifth, automatic means for inserting the core into the machine during the expulsion of the finished bale; sixth, means for holding the pivoted arms in their closed position, and, seventh, means used to counterbalance the pivoted arms in their outward movement, thus rendering the movement of the same easy and enabling them to be closed with a minimum of effort.

My invention is fully represented in the drawings which accompany and form a part of this application, in which the same reference-numerals refer to the same or corresponding parts, and in which—

Figure 2:
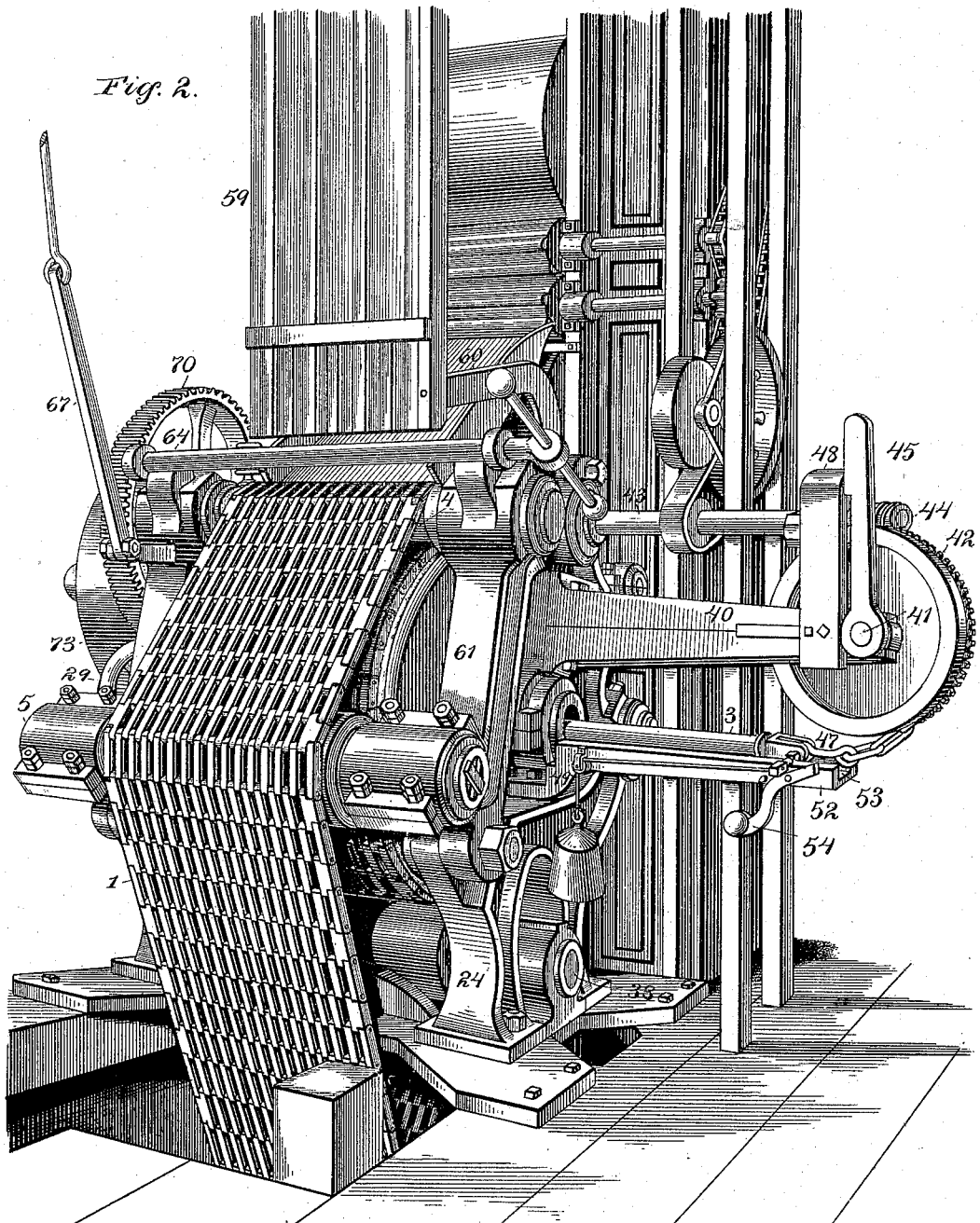
Figure 3:
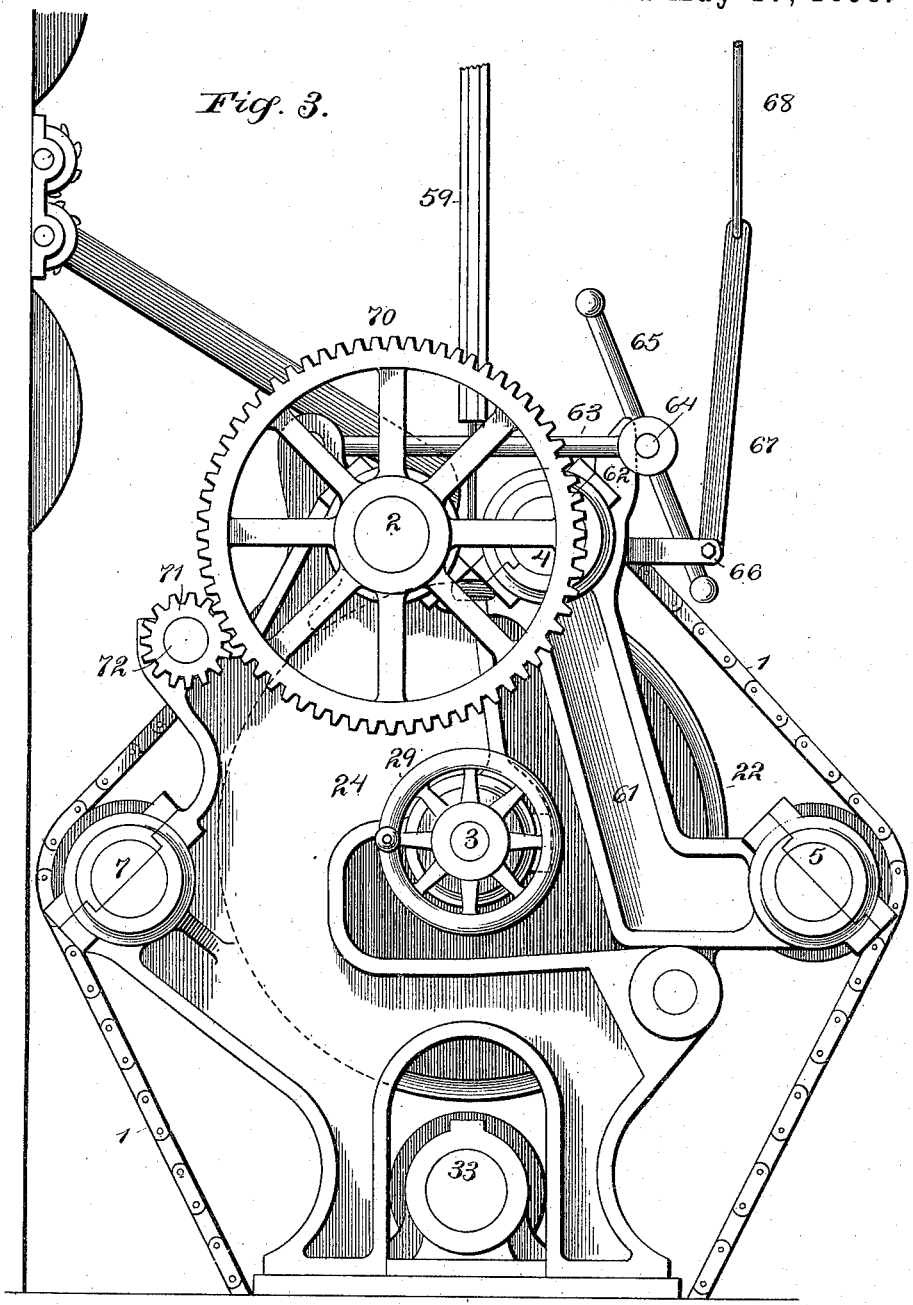
Figure 4:
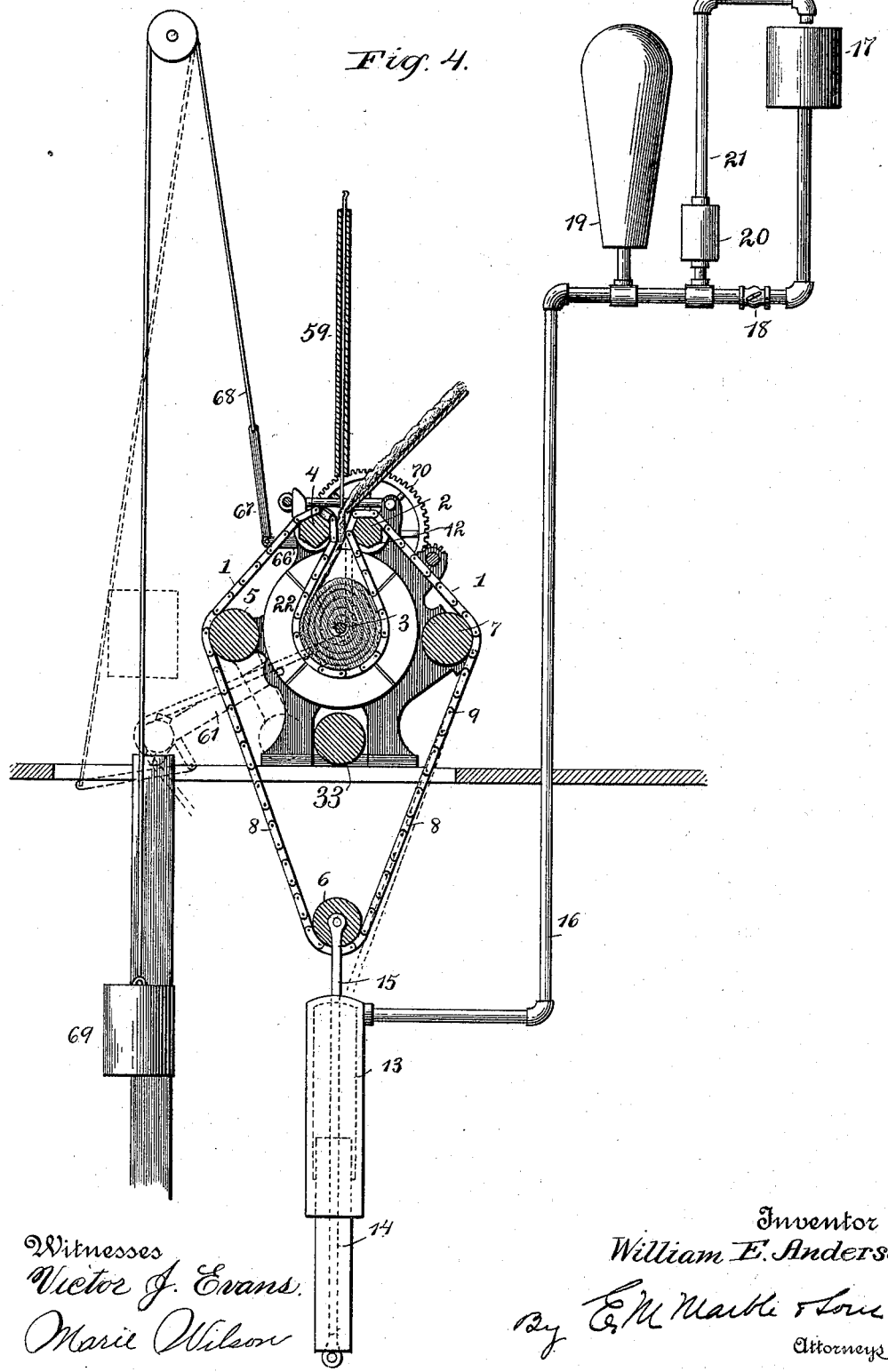
Figure 5:
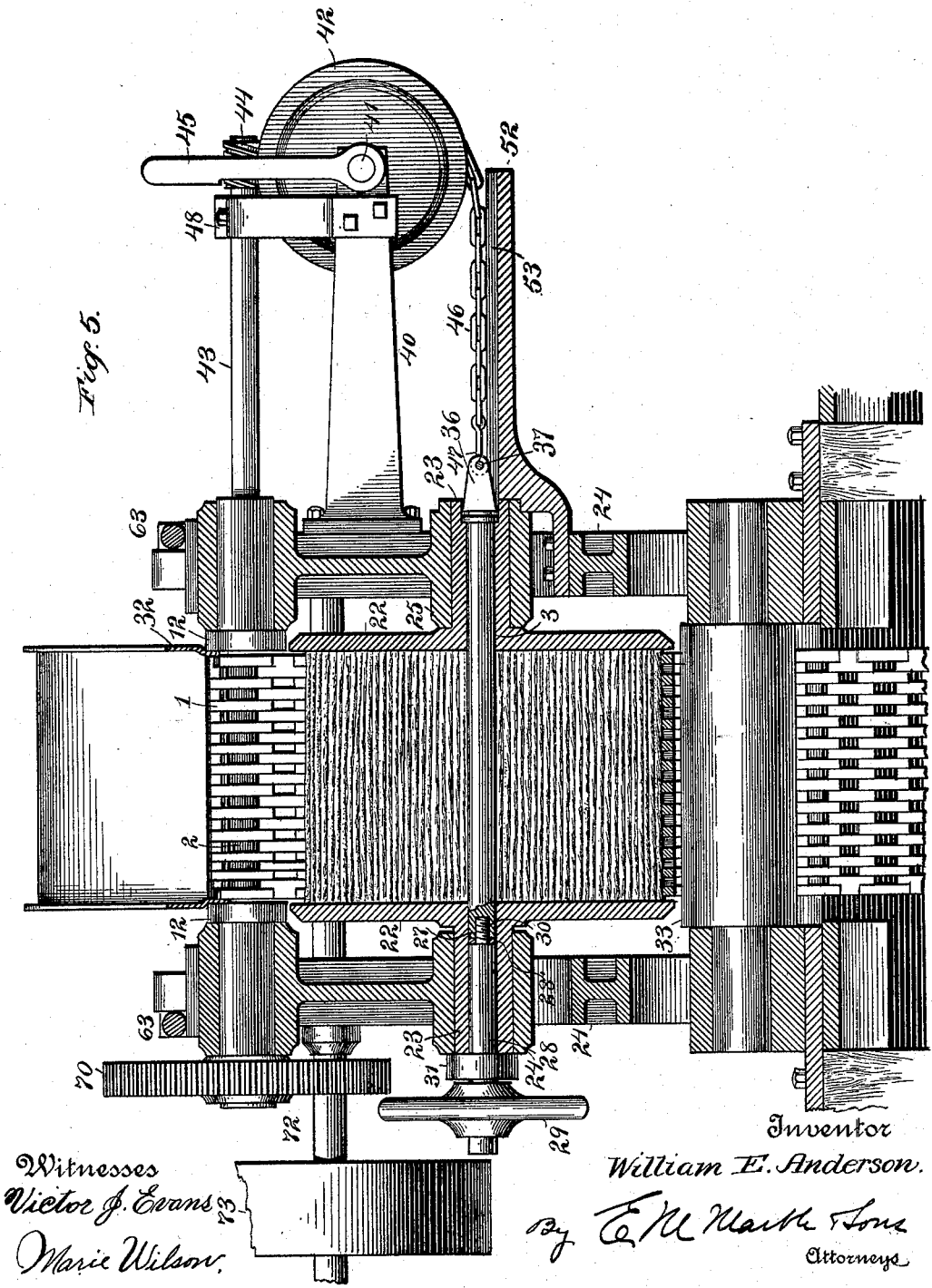
Figure 6:
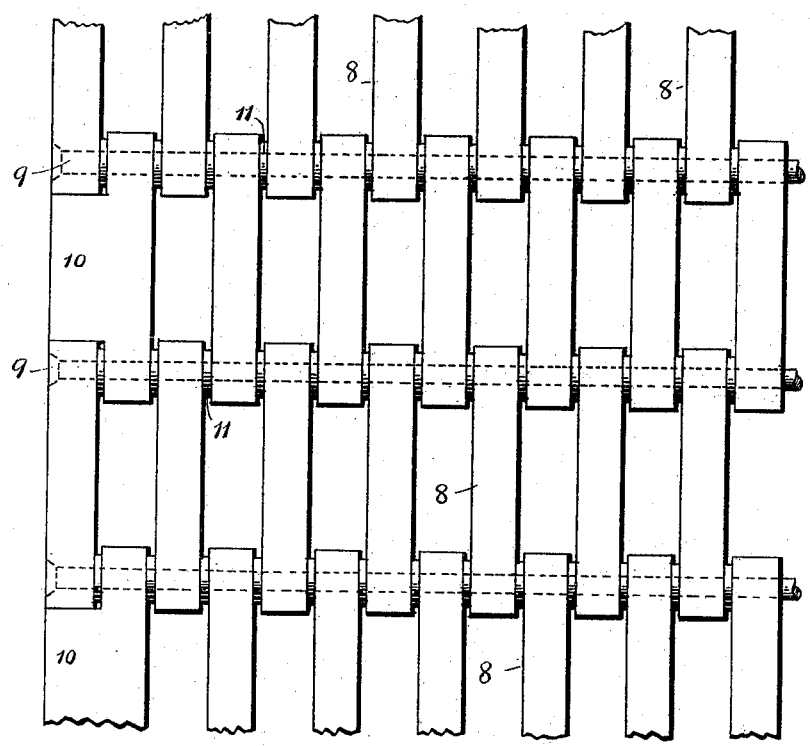
Figure 7:
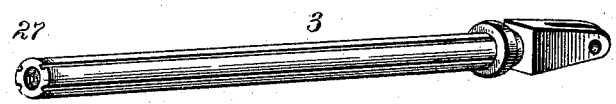
Figure 8:
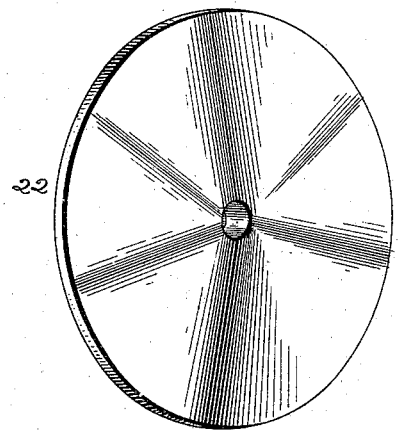
Figure 9:
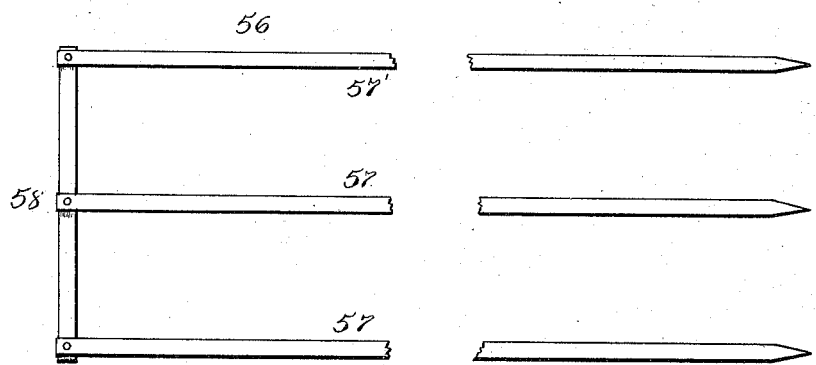

Figure 1 is a perspective view of my machine, showing the loop or bight of the belt open. Fig. 2 is a similar perspective view showing the loop or bight of the belt closed and the bale in process of formation. The bale here represented is now almost completely formed and, as shown, the core has been removed from the bale. Fig. 3 is an end view of my improved press, showing particularly the mechanism used to drive the same, the position and arrangement of the several rolls, and the swinging bar, which plays an important part in counterbalancing the movement of the pivoted arm. Fig. 4 is a central section of the machine, showing the adjustable hydraulic means used to control the tension to which the endless belt is subjected and showing the counterbalancing mechanism. Fig. 5 is a vertical cross-section of the machine on the line of the removable core, showing the core in position. Fig. 6 is an enlarged detail view of the belt, showing the manner in which the links which form the same are held together. Fig. 7 is a detail view of a modified form of core, showing longitudinal grooves formed in the same. Fig. 8 is a view of a modified form of one of the end flanges, showing the same formed with a slightly-conical inner surface. Fig. 9 is a detail view of the tie used to hold the finished bale.

Referring to the drawings, 1 indicates an endless belt. This belt passes over the hexagonal power-roll 2, around the core 3, over the roll 4, which, like the power-roll, is stationed at the entrance of the loop or bight formed by the belt passing around the core, over the guide-roll 5, around the tension-roll 6, over the guide-roll 7, and back to the starting-point. It is within the loop or bight of the belt that the bale of cotton is formed by the direct feeding of the cotton in the form of a sheet or bat from a neighboring condenser into the loop or bight of the belt, where by the rotation of the belt it forms itself into a cylindrical bale, each layer of which is compressed to the desired extent as it becomes a part of the bale by the continued pressure afforded by the belt. To permit the size of the loop or bight to increase as the bale is formed, and thus to accommodate itself to the increasing circumference of the bale, the tension-roll is made vertically movable, and to provide for the expulsion of the finished bale means are provided for opening the loop or bight of the belt sufficiently far to enable the bale to freely roll out of the same.

The machine which I have constructed is built up, as it were, with this endless belt as a center—that is to say, it has been devised to enable the operations of the belt to take place with the greatest freedom, with the least amount of applied power, and with the least possible loss of power. Devices have further been provided for guiding the bale as it is formed within the loop or bight of the belt and for insuring the production of bales with straight or approximately straight ends.

In the description which follows there will be considered, first, the belt itself and the manner of supporting the same; second, the means for imparting tension to the belt; third, the means for guiding the formation of the bale; fourth, the means for removing and replacing the core; fifth, the means for putting the ties in place around the bale; sixth, the means for opening the loop or bight of the belt; seventh, the power mechanism for rotating the belt, and, lastly, eighth, the operation of the entire machine.

*First. The belt and manner of supporting the same.*—Heretofore great difficulty has been found in constructing machines of this character in providing a belt which shall fulfil the functions assigned to it and shall at the same time be durable. Leather belts and rubber belts have been experimented with; but it has been found that not only is their first cost quite large, but that they are not sufficiently durable to meet the working conditions. I have overcome this difficulty by making my belt of a series of sections of iron links. These links may be of any desired size and thickness. Their length is also subjected to variation and is determined by the necessity of having the sections of the proper size to enable the bight of the belt when expanded during the last stages of the formation of the bale to be comparatively round. This belt is shown in Figs. 1 and 2 and in detail in Fig. 6. By referring to these figures it will be seen that the belt is composed of a series of sections of links 8, which are bored at each end to receive pins 9, which extend entirely across the belt and are so put in place that their ends are flush with the edges of the end links. The links held upon the rivet-pins are swung alternately in different directions, so that there is a space between each two adjacent links in the belt. These spaces, however, do not interfere with the belt exerting the desired pressure upon the bat of cotton which enters the loop or bight of the belt and forms the bale, as the pressure is, in effect, uniform over the whole surface of the belt, because the links in adjacent sections of the belt alternate over the whole surface of the belt. As a result of this and of the rapid rotation of the belt the compressing power exerted by this belt is, in effect, the same as that exerted by a solid belt, and, moreover, the openings provided permit the escape of the air as it is pressed out of the separate layers of the bale. To enable the ends of the bale to be perfectly uniform it is, however, essential that the edges of the belt be continuous, and for this reason to alternate end links are secured either in the formation of the link or by annexing after it is formed projecting lugs 10, which fill in the gap between the two rivet-pins and cause the edge of the belt to be continuous.

If the edges of the links were allowed to come close to each other, the cotton as it is fed into the loop or bight of the belt would be apt to be caught between the sharp meeting surfaces thus formed. To prevent any such action, washers 11 are placed between each link. These washers do not extend to the surface of the links, but are each of such a size as to have their peripheries remain some little distance below the surface. It is not necessary that these washers be very wide, as so long as there is a space between the links on the surface of the belt the cotton will not be caught between the meeting surfaces of the links.

The belt is held in a fixed position on the rollers of the press by end flanges 12, formed on the power-roll 2 and on the loop entrance guide-roll 4. Both of the rolls mentioned are made hexagonal, so as to enable them to have a strong grip on the belt and thus to insure its rotation. They are, however, round in their journals, and the flanges 12 formed on either end of each roll are in fact caused by the cutting of the middle portion of the roll into a hexagonal surface. With the exception of these two rolls, one on either side of the entrance of the loop or bight of the belt, all the rolls used in this machine have rounded surfaces.

*Second. Means for imparting tension to the belt.*—It is evident that cotton can only be compressed in the loop or bight of the belt to the desired degree by imparting tension to the belt, and it is further evident, on account of the fact that the loop or bight of the belt must expand with the gradual increase of the circumference of the bale formed therein, that the tension means must be such as will permit a vertical movement of the tension-roll. Heavy tension-rollers have been used for this purpose, the weight of the roll, either by itself or by a weight-box attached, being sufficient to exert the required tension on the belt. These devices are, however, bulky and afford no satisfactory means for adjustment. A bale of a specified density can be made by their use, but the density of the bale cannot be altered, but must remain always the same unless the weights in the weight-box are changed.

In my present construction I make use of an adjustable tension device, so that the pressure exerted by the loop or bight of the belt upon the bat of cotton as it is formed into a bale can be varied within quite large limits. For a given size of bale this pressure will usually remain uniform; but in working up odd quantities of cotton it is often convenient to vary the density of one or more bales in order that the cotton may be entirely used up. For instance, if in making bales of two hundred and fifty pounds weight there is left an odd amount of one hundred and fifty pounds of cotton it is more convenient to make this cotton into a bale of uniform size by decreasing the pressure upon the belt, and therefore the density of the bale formed, than to make it into an imperfect bale.

My tension device consists of a hydraulic jack 13, the piston 14 of which is connected to the tension-roll 6 by side rods 15, which extend downward from both ends of the tension-roll. Water is admitted to the top of the jack by the pipe 16, which extends upward and ends in a reservoir 17, said reservoir being sufficiently large to contain the amount of water required by the working conditions. A check-valve 18 is interposed near the reservoir to enable the water to be completely shut off from the same. Between the hydraulic jack and the check-valve I place an air-chamber 19 and a relief-valve 20, to which latter is connected the pipe 21, which empties into the reservoir 17. The relief-valve 20 is of any ordinary adjustable type and may be set at any pressure desired. The operation of this portion of my machine is as follows: Starting with the press empty and the jack 13 at the lower end of its stroke, when a bat of cotton is fed into the press and is wound around the core the tension-roller 6 must of necessity be gradually raised to permit the loop or bight of the belt to expand as the bale formed in the same increases in circumference. If no air-chamber were used in the line connection between the hydraulic jack and the reservoir provided therefor the upward movement of the tension-roll could not be commenced until the limiting pressure provided by the setting of the relief-valve had been reached. The bearing-surface of the belt upon the bale in the first stages of its formation is very small and is reduced almost to the section of the belt under the core. If the cotton had been packed at the beginning of the bale to such a density as to raise the tension-roll against the full pressure at which the relief-valve operates, the bale formed would be of unequal density, as the density at the center of the bale would be much greater than that of any other portion of the same. To prevent this and to enable the bale formed to be of uniform density throughout, the air-chamber 19 is provided. This permits the piston 14 to move upward a very little as soon as the upward tendency of the tension-roll overcomes the pressure of the water between the jack and said air-chamber. Then the water is forced into the air-chamber until the pressure of the air upon the water in said chamber is equal to the setting of the relief-valve, when the water will begin to be forced through the relief-valve and will continue to be forced throughout the remainder of the rising of the tension-roll. The tension imparted to the belt in this manner is adapted to cause the bale formed to be of uniform density, which is the result desired.

The rate of fall of the tension-roll when the press is opened to permit the expulsion of the finished bale is also controlled by the hydraulic jack, as the piston thereof cannot fall any faster than water can flow into the jack-cylinder, and this can be regulated by the size of the pipe used. Both the rise and fall of the tension-roll are under the complete control of the operator. Before the fall of the tension-roll can take place the check-valve 18 must of course be opened.

*Third. The means for guiding the bale in its formation.*—In order to enable the bales to be formed with straight ends, it has been found necessary to provide means for preventing excessive end expansion of the bale. These means in the present case consist of the end flanges 22, which in the construction shown are revolubly mounted upon the core 3 and movable independently of the same. On each of the flanges is formed a hollow central projecting lug 23, which extends into bearings formed in the machine-frame 24, in which machine-frame are also formed suitable bearings for the various rolls. These flanges have their inner surfaces close to the edges of the belt, so that no cotton can get wedged in between the flanges and the belt. It is for the purpose of holding the flanges in this position that the bearing-boxes of the same in the machine-frame project inward, as shown at 25, and thus prevent the flanges from being forced by the expansion of the cotton away from the edges of the belt. The peripheries of the flanges are beveled, as shown, and on the inner surface of each flange there are formed a number of radial grooves 26, which insure the rotation of the flanges as the bale is being formed. This rotation while not absolutely necessary is very desirable in order to prevent the ends of the bale of cotton from getting black by reason of the friction between said ends and the flanges. When these grooves are used, the flanges revolve just as rapidly as the bale of cotton, as the cotton extends into the grooves and compels the rotation of the flanges. There is no friction between the flanges and the ends of the bale, and the bale formed has perfectly clean ends.

If desired, the core may also be grooved, and I sometimes use a core having longitudinal grooves formed in the same. If the flanges used are not formed with radial grooves, as described, it is advisable to use the grooved core, for otherwise the core will not rotate, and thus will get hot in its bearings on account of the pressure of the belt. If, however, the radially-grooved flanges be used, it is not necessary to use the grooved core.

I have sometimes used end flanges whose inner surfaces are slightly conical, as shown in Fig. 8, the width of the flange at the center being greater than at the periphery. These have been used to aid in obtaining bales with perfectly straight sides, as the tendency of cotton to end expansion is greater at the center of the bale than at the outer portions of the same and is sufficient to cause the center of the bale to expand on a line with the outer portions of the same when such flanges are used. I prefer, however, to use flanges with straight sides of the kind shown, because when they are used the inner side of the flange is close to the belt throughout the formation of the bale, and thus there is no wedging of cotton between the side of the belt and the flanges.

It has been said that both flanges are held close to the sides of the belt. One of said flanges is held rigidly in that position by means of the projecting bearing-box 25. It is desirable, however, to enable the other flange to be slightly lengthwise movable to allow for the end expansion of the bale, and for this reason one end flange is made longitudinally adjustable, as shown in Fig. 5. One end of the core is tapped, as shown at 27, and interiorly screw-threaded. The short shaft 28, on one end of which is mounted the hand-wheel 29, extends into the interior of the projecting lug 23, formed on said flange. The end of this short shaft is screw-threaded, as shown at 30, and adapted to enter the screw-threaded end of the core and engage with the same, the washer 28' being placed between the two meeting surfaces to prevent any sticking between the same. The collar 31, formed on said short shaft, bears against the end of the lug 24. Normally when this end flange is pushed backward, so that it rests against the projecting bearing 25, the end of the lug formed on the same projects slightly beyond the outer end of the bearing-box. If the screw-threaded end of the short shaft 28 be made to engage with the end of the core and then said short shaft be turned, the collar 31, formed on the same, will press against the projecting lug formed on the flange, and thus force the flange into position near the side of the endless belt. To unloosen the short shaft and allow the flange to be forced backward by the end expansion of the finished bale is but the work of a moment. The construction throughout is very simple. By employing a core which when the bale is being formed is secured at its ends to said flanges the thrust of the flanges due to end expansion is taken up by the core, and the framework of the machine is thereby relieved of such strains.

To prevent the tendency of the cotton at the edge of the almost-finished bale, directly under the space between the power-roll 2 and the guide-rolls 4, to press outward, (the cotton here being, of necessity, in a less compressed condition than at any other portion of the bale,) the bent plates 32 are used. These are bolted to the machine-frame beside the journals of the power-roll 2, and their outer ends are bent upward, so as to be in a plane with the inner faces of the end flanges and to prevent any cotton from spreading at that point.

The bale when in its last stages of formation expands the loop or bight of the belt to such an extent as to cause the same to press against the guide-rollers 5 and 7 and against the guide-roller 33, which is journaled in the machine-frame at the bottom of the same, and serves to complete the support of the bale during the last stages of its formation independently of the core. This roller not only serves to support the bale during the last stages of its formation independently of the score, but also exerts a considerable pressure against the bale itself and serves to increase the density of compression of the outer layers of the bale.

*Fourth. Means for removing and replacing the core.*—In all machines where bales of cotton are formed around central cores the cores are removed from the finished bales before they are shipped. The necessity of this will be apparent when it is considered that the core must be carefully finished on account of the strain to which it is subjected and the important part it plays in the baling-press operation. To provide separate cores for each bale would not only increase materially the cost of the bale, but would increase its weight, and there would be no corresponding advantage. In all machines of which I am aware, however, there is no provision in the machine itself for the removal of the core before the bale is expelled from the machine, and in consequence in the operation of such machines considerable time is lost in removing the cores from the bales formed and in replacing them in the machine, so that another bale can be formed. In my present machine I have devised a mechanism by which the core can be removed from the bale when the bale is in the last stages of its formation and by which the core can be inserted into the loop or bight of the belt while the bale is leaving the press and after its periphery has passed the core-opening. Both the means for removing the core and the means for replacing the same operate automatically after their operation is once commenced.

It has been stated that when the bale is in the last stages of formation it is supported independently of the core by the side guide-rollers 5 and 7, the bottom guide-roller 33, and the end flanges 22. There is therefore no great amount of pressure upon the core in its bearings, and as the surface of the same is either perfectly smooth or slightly grooved no opposition on the part of the bale formed other than friction to prevent its removal. The core itself is inserted in position in the machine through the hollow centrally-projecting lugs formed on the end flanges 22, so that its manner of support in the machine is such as to permit its removal independently of the bale.

It has been stated that one end of the core is tapped and interiorly screw-threaded to permit the adjustable end flange to be held in position close against the side of the belt by means of the pin 28 and the parts connected therewith. To the outer end of the core is attached the U-shaped swivel 36. Between the sides of this U-shaped swivel extends the short shaft 37. The portion of this shaft which is between the two sides of the U-shaped swivel 26 is round, while the portion of the same projecting to one side of said swivel is square. Projecting from one side of the machine-frame is the standard 40, on the outer end of which is journaled in an eccentric bearing 41 the worm-wheel 42. From one end of the power-roll 5 projects the extension-shaft 43, integrally formed with the said power-roll, on the outer end of which is formed the worm-screw 44, which normally is not in engagement with the worm-wheel 42, but is in such relation thereto that when the lever 45, which is attached to the shaft of the worm-wheel 42, is raised in a vertical position, the wheel 42 and screw 44 will mesh, and the worm-wheel 42 will be revolved. To the periphery of this worm-wheel is secured the chain 46, which ends in the hook 47, adapted to hook around the short shaft 37, extending between the sides of the U-shaped swivel 36.

When it is desired to remove the core from the bale, the hand-wheel 29 is turned so as to withdraw the short shaft 28 from engagement with the tapped screw-threaded end of the core, and thus to permit the adjustable end flange 22 to be forced backward against its bearings by the end expansion of the bale. The hook 47 is then hooked around the short shaft 37 and the lever 45 is raised, thus moving the worm-wheel 42 in its eccentric bearing and causing the same to mesh with the worm-screw 44 on the extension of the power-shaft. The worm-wheel 42 is at once revolved and the core removed from the bale. The length of the standard 40 is such that the core can be pulled out sufficiently far to allow its end to clear the edge of the bale. When the core has been pulled out a proper distance, the lever 40 is thrown down and the worm-wheel 42 drops out of engagement with the worm-screw 44. To act as a support to the standard 40 and to hold the same in proper relation to the shaft 43, the U-shaped bracket 48 has been provided. This, however, is but one of the many forms of construction applicable for this purpose.

It is necessary to replace the core in position in the machine during the expulsion of the finished bale of cotton from the machine and before the side of the loop or bight of the belt has passed the central-core-shaft opening in the end flange 22, because otherwise the whole belt would have to be lifted to permit the insertion of the core in its proper position. This can be accomplished by hand, if desired. The end of the core which passes across the face of the belt is slightly beveled. When the bale is beng expelled from the machine, the operator can press the end of the core constantly against the end surface of the bale as it passes by the core. The pressure he exerts must not be sufficient to cause the end of the core to impinge against the bale with sufficient force to obstruct or hinder the expulsion of the same. The last few layers of the bale are, however, somewhat less tightly compressed than the interior layers, and consequently the pressure against the side of the bale, while not sufficient to hinder the expulsion of the bale, will be sufficient to cause the end of the core to enter the extreme layers of the bale and to catch between the periphery of the bale and the belt, thus permitting the core to be forced into position across the surface of the belt by a rapid push. The bearing-surface afforded the core by the hollow centrally-projecting lug 23 is alone sufficient to insure the core entering the corresponding lug in the opposite end flange. While this can be accomplished, as stated, by an operator, it is very convenient to replace the core in the machine by automatic means, and the means which I have devised are as follows: To the square projecting end of the short shaft 37 I attach the cord 49, which passes through the pulley 50 and has on its end a weight 51. To the side of the machine-frame I bolt or otherwise secure the projecting guide 52, in the bottom of which is formed a trough 53 of sufficient width to accommodate the U-shaped swivel 36 in its movement and of a depth sufficient to cause the core to be supported in line with its bearings in the end flanges. To one side of the end of the projecting guides 52 I pivot a weighted pawl 54, provided with a stop 55. When now the core is removed from the bale in the manner which has been above described, it is apparent that its outward movement serves to lift the weight 51. This weight is so regulated as to be sufficient to cause the end of the core to press against the side of the bale of cotton when the weight is allowed to act with sufficient force to catch the belt without interfering with the removal or expulsion of the bale. When the end of the core has cleared the edge of the bales, the short shaft 37 will have just passed the pawl 54 and will be caught by the same and there held until the pawl is tripped.

It can readily be seen that when it is desired to replace the core in the machine while the bale is being expelled from the machine the weighted pawl 54 is tripped and the end of the core catches the belt at the proper moment in the manner specified. If the action of the weight 51 be not sufficient to cause the core to move across the belt-surface with sufficient rapidity, a push of the foot will aid it.

The removal of the core is preferably accomplished after the bale has grown to such a size as to be supported, practically, between the guide-rollers and the end flanges in the manner stated. It may be accomplished, however, at an earlier stage of the formation of the bale.

*Fifth. Means for putting the ties in position.*—The ties 56, which are to be put around the finished bale before it is expelled from the press, are shown in detail in Fig. 9. As there shown, it will be seen that the tie consists of three straight pieces 57, of sheet-iron, of suitable width and of a length sufficient to enable them to entirely pass around a complete bale, held together at the top by a simple cross-piece 58, riveted firmly to the three strips or ties.

The tie is held in a vertical position over the opening in the loop or bight of the belt, through which the bat of cotton is fed into the machine, in guideways 59, which are held in position by the bottom supporting-bracket 60 and by a top supporting-bracket. (Not shown.)

When the bale has been finished and it is desired to tie the same previous to its expulsion from the press, the holding means used to prevent the ties from dropping is removed and the tie is fed into the machine along with the bat of cotton. The feeding of the cotton is not interrupted during the entire operation of the press. The ties pass around the loop or bight of the belt with the bat of cotton which they accompany, and the ends of the same as they approach the opening through which they enter are inclined upward over the hillock of loose cotton there present. The length of the ties is so proportioned that while they thus project upward the cross-piece 58 is fed downward into the machine, and the ends of the ties during the continuous rotation of the bale are bent over by the entrance guide-roll 4, thus tying the bale.

The manner of formation of the bale is such that ties of sufficient strength to hold in place the outer layers of the bale are sufficient to tie the whole bale, as each layer acts of itself to tie the layer next under the same. The tying of the bale is thus accomplished by the action of the machine independently of any outside labor. The tie is fastened on the bale perfectly securely and without any danger of slipping or breakage.

*Sixth. Means for permitting the expulsion of the finished bale.*—To permit the expulsion of the finished bale, the loop or bight of the belt must of course be opened. The means I provide in my present machine for opening the loop or bight of the belt are as follows: To the machine-frame I pivot arms 61, which support in bearings at their upper ends the guide-roll 4, which is at the entrance of the loop or bight of the belt and between which and the power-roll the bat of cotton passes as it is fed into the machine. In the construction shown I also journal in said pivoted arms the side guide-roll 5; but this is not essential to the operation of the machine, though advantageous, because it permits said roll 5 to be supported where it can exert pressure upon the outer surface of the bale during the last stages of its formation and also where it can guide and properly direct the endless belt as it passes down around the tension-roll. On the rear or back surface of the pivoted arm 61 are formed lugs 62, which lugs project out sharply at their upper end from the pivoted arm and are formed with a sloping back surface. To the sides of the machine are pivoted rods 63, which embrace with their outer ends the cross-rod 64, on one end of which is secured the sliding handle 65. This cross-rod serves to hold the pivoted arms 61 in their upward position when it is rolled down the sloping back surface of the lugs 62. To open the loop or bight of the belt, the cross-rod 64 is rolled up the back surface of the lugs 62 until it is free from engagement with the same, when the tension on the belt will of itself cause the pivoted arms to swing downward.

If the fall of the pivoted arms were unbalanced, there would be a great deal of shock and wear attending with its operation. To provide a proper counterbalance for the pivoted arm in its movement is not as simple as it would seem at first sight, for the weight required to counterbalance the same in its movement is not constant, but increases rapidly as the said pivoted arm nears its horizontal position.

The means which I have devised to serve as a counterbalance for the pivoted arms are as follows: From one of the pivoted arms projects the stud 66, to which is pivoted the swinging arm 67, the upper end of which is attached, by means of a rope or chain 68, to the counterweight 69. As the pivoted arm 61 falls during the first stages of its movement the counterweight 69 will be raised in proportion to the extent of the movement of the pivoted arm and the consequent descent of the end of the stud 66. As, however, the pivoted arm nears its horizontal position, and consequently requires a greatly-increased counterbalancing-weight to properly counterbalance its movement, the swinging arm comes into contact with the projecting lug 52', formed on the pivoted arm, and is thus made to swing downward much more rapidly than it normally would, and thus to exert a greater counterbalancing effect. By properly adjusting the length of the stud 66, the swinging arm 67, and the other parts essential to the operation of the counterbalancing mechanism a very perfect counterbalance may be obtained in the manner stated, and the movement of the pivoted arms 61 may be made free and easy, so that it is an easy matter for a man to with one hand raise the pivoted arm into position after the bale has been expelled and by properly turning the handle 65 cause the cross-rod 64 to roll down the surface of the lug 62 and lock the pivoted arms in closed position again.

*Seventh. The power mechanism of the machine.*—The mechanism for imparting power to my press is very simple. On one end of the power-shaft 2 is mounted the large gear-wheel 70, which meshes with the smaller gear-wheel 71 on the power-shaft 72. A belt is used to drive the pulley 73, and the speed of the driving is such as to cause the belt to be rotated at a speed corresponding to that with which the bat of cotton is fed into the machine. The speed of rotation of the belt may, if desired, be made slightly greater than that at which the bat of cotton is fed to it, so as to stretch the bat. This is optional with the operator.

*Eighth. The operation of the entire machine.*—At the beginning of the formation of the bale the press is open in the position shown in Fig. 1, the bale having just been expelled. The feeding of the cotton is not, however, interrupted during such expulsion and cotton is already gathering in the loop or bight of the belt. The operator pushes the loose cotton under the core with a suitable stick, so that when the press is closed the formation of the bale will proceed in the proper manner and the bat of cotton will be fed around the core in the proper direction. As the bale is formed in the loop or bight of the belt it distends such loop or bight, compelling the same to raise the tension-roller against, first, the pressure of the air in the air-chamber, and, second, against the pressure required to open the relief-valve. The speed of rotation of the belt is either equal to that at which the bat is fed to the machine or slightly greater; but in any case the bat is constantly fed around the core and is not broken or disrupted during the entire operation of the press. The loop or bight of the belt will finally distend sufficiently to cause it to press against the guide-rollers 5 and 7 and the bottom guide-roller 33. These in turn will act to compress the outer layers of the bale.

When the bale has reached the proper stage of its formation, the hand-wheel 29 is turned in a manner previously stated, thus permitting the adjustable end flange 22 to spring back and allow the end expansion of the bale. The core is now removed by the core-withdrawing mechanism and the ties fed around the bale and secured in position thereon. The cross-rod 64 is now rolled up the back surface of the lug 62 until it frees said lug and allows the pivoted arm to be opened by the constant tension of the belt. The pivot-arm is balanced by the counterbalancing mechanism previously described, so that its fall takes place without any jar. The bale of cotton rolls out of the press, and as it rolls out of the press the core is replaced in position in the machine in the manner previously described. The adjustable end flange 22 is secured in its working position and the operator starts the formation of a new bale and the press is closed, thus completing one cycle of its operation.

I do not wish to restrict myself to the details of construction shown. In most cases the particular construction shown has been chosen from a number of constructions present before me by reason of its adaptitude for the working conditions of the machine in hand; but

What I claim as new, and desire to secure by Letters Patent, is—

1. In a press for making cylindrical cotton-bales, the combination with a machine-frame, of flanges having hollow central lugs mounted in said frame, a core extending between said flanges, a rod mounted in one of said hollow central lugs, and connected by screw-threads with the adjacent end of said core, and means for feeding cotton in the form of a sheet or bat to and around said core, substantially as set forth.

2. In a press for making cylindrical cotton-bales, the combination with a machine-frame, of flanges having hollow cylindrical lugs revolubly mounted in said frame, a core extending between said flanges, a rod mounted in one of said cylindrical lugs, and connected by screw-threads with the adjacent end of the core, and means for feeding cotton in the form of a sheet or bat to and around said core, substantially as set forth.

3. In a press for making cylindrical cotton-bales, the combination with a machine-frame, of flanges having hollow central lugs projecting into boxes formed in said frame, one of said flanges being longitudinally adjustable, a core having a tapped interiorly-screw-threaded end extending between said flanges and supported in said hollow lugs, a rod having a screw-threaded end, a shoulder mounted on the same and bearing against the projecting lug of the adjustable flange, means for operating said rod and thereby controlling the position of said adjustable flange, and means for feeding cotton in the form of a sheet or bat to and around said core, substantially as set forth.

4. In a press for making cylindrical cotton-bales, the combination with an endless belt arranged to form an expansible loop or bight, rolls for supporting and guiding the said belt, means for imparting tension to said belt, and means for imparting motion to the same, of a core mounted in the loop or bight of said belt, and means operated by the press for withdrawing said core, substantially as set forth.

5. In a press for making cylindrical cotton-bales, the combination with an endless belt arranged to form an expansible loop or bight, rolls for supporting and guiding said belt, means for imparting tension to said belt, and means for imparting motion to the same, of a core mounted within the loop or bight of said belt, means operated by the press for withdrawing said core, and means for automatically returning said core to its operative position, substantially as set forth.

6. In a press for making cylindrical cotton-bales, the combination with an endless belt arranged to form an expansible loop or bight, rolls for supporting and guiding said belt, means for imparting tension to said belt, and means for imparting motion to the same, of a core mounted within the loop or bight of said belt, means operated by the press for withdrawing said core, and a weight for automatically returning said core to its operative position, substantially as set forth.

7. In a press for making cylindrical cotton-bales, the combination with an endless belt arranged to form an expansible loop or bight, rolls for supporting and guiding said belt, means for imparting tension to said belt, and means for imparting motion to the same, of a core mounted within the loop or bight of said belt, flanges mounted upon both ends of said core adapted to guide the formation of the bale, and means operated by the press for withdrawing said core, substantially as set forth.

8. In a machine for making cylindrical cotton-bales, the combination with an endless belt arranged to form an expansible loop or bight, rolls for supporting and guiding said belt, means for imparting tension to said belt, and means for imparting motion to the same, of a core mounted within the loop or bight of said belt, flanges mounted upon both ends of said core adapted to guide the formation of the bale, means operated by the press for withdrawing said core, and means for automatically returning said core to its operative position, substantially as set forth.

9. In a press for making cylindrical cotton-bales, the combination with an endless belt arranged to form an expansible loop or bight, rolls for supporting and guiding said belt, means for imparting tension to said belt, and means for imparting motion to the same, of a core mounted within the loop or bight of said belt, flanges mounted upon both ends of said core adapted to guide the formation of the bale, means operated by the press for withdrawing said core, and a weight for automatically returning said core to its operative position, substantially as described.

10. In a press for making cylindrical cotton-bales, the combination with an endless belt arranged to form an expansible loop or bight, rolls for supporting and guiding said belt, means for imparting tension to said belt and means for imparting motion to the same, of a core mounted within the loop or bight of said belt, means operated by the press for withdrawing said core, and means for locking said core in its withdrawn position, substantially as set forth.

11. In a press for making cylindrical cotton-bales, the combination with an endless belt arranged to form an expansible loop or bight, rolls for supporting and guiding said belt, means for imparting tension to said belt and means for imparting motion to the same, of a core mounted within the loop or bight of said belt, means operated by the press for withdrawing said core, means for locking said core in its withdrawn position, and means for automatically returning said core to its operative position, substantially as set forth.

12. In a press for making cylindrical cotton-bales, the combination with an endless belt arranged to form an expansible loop or bight, rolls for supporting and guiding said belt, means for imparting tension to said belt and means for imparting motion to the same, of a core mounted within the loop or bight of said belt, means operated by the press for withdrawing said core, means for locking said core in its withdrawn position, and a weight for automatically returning said core to its operative position, substantially as set forth.

13. In a press for making cylindrical cotton-bales, the combination with a machine-frame, of a core around which a bale of cotton is formed, means for feeding cotton in the form of a sheet or bat to and around said core, means operated by the press for withdrawing said core, and means for automatically returning said core to its operative position, substantially as set forth.

14. In a press for making cylindrical cotton-bales, the combination with a machine-frame, of a core around which a bale of cotton is formed, means for feeding cotton in the form of a sheet or bat to and around said core, means operated by the press for withdrawing said core, and a weight for automatically returning said core to its operative position, substantially as set forth.

15. In a press for making cylindrical cotton-bales, the combination with a machine-frame, of a core around which a bale of cotton is formed, means for feeding cotton in the form of a sheet or bat to and around said core, means operated by the press for withdrawing said core, and means for locking said core in its withdrawn position, substantially as set forth.

16. In a press for making cylindrical cotton-bales, the combination with a machine-frame, of a core around which a bale of cotton is formed, means for feeding cotton in the form of a sheet or bat to and around said core, means operated by the press for withdrawing said core, means for locking said core in its withdrawn position, and means for automatically returning said core to its operative position, substantially as set forth.

17. In a press for making cylindrical cotton-bales, the combination with a machine-frame, of a core around which a bale of cotton is formed, means for feeding cotton in the form of a sheet or bat to and around said core, a standard 40 projecting from said machine-frame, a worm-wheel 42 mounted in said standard, a worm 44 driven from the press normally disengaged from said worm-wheel 42 but adapted to be engaged therewith, and a connection between said worm-wheel and the core, substantially as set forth.

18. In a press for making cylindrical cotton-bales, the combination with a machine-frame, of a core around which the bale of cotton is formed, means for feeding cotton in the form of a sheet or bat to and around said core, a standard 40 projecting from said machine-frame, a worm-wheel 42 eccentrically mounted in said standard, a worm 44 operated by the press and normally out of engagement with the said worm-wheel, a lever 45 for engaging the worm-wheel 42 with the worm 44, and a connection between said worm 42 and one end of the core, substantially as set forth.

19. In a press for making cylindrical cotton-bales, the combination with a machine-frame, of a core around which a bale of cotton may be formed, means for feeding cotton in the form of a sheet or bat to and around said core, means for withdrawing the core while the bale is in the press, and means for automatically returning the core in the press, substantially as set forth.

20. In a press for making cylindrical cotton-bales, the combination with a machine-frame, of a core around which a bale of cotton may be formed, a belt arranged to form an expansible loop or bight for feeding the cotton in the form of a sheet or bat to and around said core, means for withdrawing the core while the bale is still in the press, and means for automatically replacing the core in the press during the expulsion of the bale and before the loop or bight of the belt has passed the core, substantially as set forth.

21. In a press for making cylindrical cotton-bales, the combination with a machine-frame, of a core around which a bale of cotton may be formed, means for feeding cotton in the form of a sheet or bat to and around said core, means for withdrawing the core while the bale is still in the press, means for replacing the core in the press, and means for restraining said replacing means for operation, substantially as set forth.

22. In a press for making cylindrical cotton-bales, the combination with a machine-frame, of a core around which a bale of cotton may be formed, means for feeding cotton in the form of a sheet or bat to and around said core, means for withdrawing the core while the bale is still in the press, and a guideway for supporting said core when it is withdrawn from the press, substantially as set forth.

23. In a press for making cylindrical cotton-bales, the combination with a machine-frame, of a core around which a bale of cotton may be formed, means for feeding cotton in the form of a sheet or bat to and around said core, means for withdrawing the core while the bale is still in the press, a guideway for said core when it is withdrawn from the press, means for replacing the core in the press, and means stationed in said guideway for preventing the operation of the replacing mechanism, substantially as set forth.

24. In a press for making cylindrical cotton-bales, the combination with a machine-frame, of a core around which a bale of cotton may be formed, means for feeding cotton in the form of a sheet or bat to and around said core, means for withdrawing the core while the bale is still in the press, a weight attached to said core for replacing the same automatically, a guideway 52 for said core when it is removed from the press, and a weighted pawl 54 for holding the core in its withdrawn position, substantially as set forth.

25. In a press for making cylindrical cotton-bales, the combination with a belt arranged to form an expansible loop or bight, of a machine-frame, arms pivoted in said frame adapted to swing outward, a guide-roll stationed at the entrance of the loop or bight of the belt journaled in said arms, means for locking said arms in a closed position, a swinging lever 67 carried by one of said swinging arms, a lug for engaging with said swinging lever when the arms have moved partially outward, and a weight attached to said swinging lever for counterbalancing said pivoted arms during their movement, substantially as set forth.

26. In a press for making cylindrical cotton-bales, the combination with a belt arranged to form an expansible loop or bight, of a core within said loop or bight around which a bale of cotton may be formed, means for feeding cotton in the form of a sheet or bat to and around said core, and bent pieces 32 stationed at the entrance of the loop or bight of the belt for preventing spreading of the cotton, substantially as set forth.

27. In a cotton-press for making cylindrical bales, the combination of means for winding a continuous sheet or bat into a bale, and mechanism operating therewith for effecting pressure on the bale during its formation, comprising a hydraulic cylinder, a piston in said cylinder moved therein as the bale enlarges, and a closed air-chamber connected with said cylinder whereby as the bale enlarges the liquid will be forced out of said cylinder into said air-chamber to gradually compress the air in the latter, substantially as and for the purpose described.

28. In a cotton-press for making cylindrical bales, the combination of a core on which a continuous sheet or bat is spirally wound, a traveling pressure-surface movable away from said core with the enlarging bale, and revolving said bale so as to wind the sheet or bat thereon, a hydraulic cylinder, a piston therein connected with said traveling pressure-surface and moving in said cylinder as the bale enlarges, and a closed air-chamber connected with said cylinder, whereby as the bale enlarges the liquid will be forced out of said cylinder into said air-chamber to gradually compress the air in the latter, substantially as and for the purpose described.

In testimony whereof I affix my signature in presence of two witnesses.

WILLIAM E. ANDERSON.

Witnesses:
JOS. LOEB,
J. F. LENON.